United States Patent
Maksymov et al.

(10) Patent No.: US 12,505,375 B2
(45) Date of Patent: Dec. 23, 2025

(54) DEBUGGING OF QUANTUM CIRCUITS

(71) Applicant: IONQ, INC., College Park, MD (US)

(72) Inventors: Andrii Maksymov, Hyattsville, MD (US); Jason Hieu Van Nguyen, Hyattsville, MD (US); Igor Leonidovich Markov, Mountain View, CA (US); Yunseong Nam, North Bethesda, MD (US)

(73) Assignee: IONQ, INC., College Park, MD (US)

( * ) Notice: Subject to any disclaimer, the term of this patent is extended or adjusted under 35 U.S.C. 154(b) by 869 days.

(21) Appl. No.: 17/746,871

(22) Filed: May 17, 2022

(65) Prior Publication Data

US 2022/0383179 A1 Dec. 1, 2022

Related U.S. Application Data

(60) Provisional application No. 63/191,218, filed on May 20, 2021.

(51) Int. Cl.
*G06N 10/70* (2022.01)
*G06F 7/57* (2006.01)
(Continued)

(52) U.S. Cl.
CPC .............. *G06N 10/60* (2022.01); *G06F 7/57* (2013.01); *G06N 10/20* (2022.01); *G06N 10/70* (2022.01)

(58) Field of Classification Search
None
See application file for complete search history.

(56) References Cited

U.S. PATENT DOCUMENTS 10,423,887 B2    9/2019  Roetteler et al.
2018/0114138 A1*  4/2018  Monroe ................. G06N 10/70
(Continued)

FOREIGN PATENT DOCUMENTS

WO    2020236231 A1    11/2020

OTHER PUBLICATIONS

Laborde Margarite et al. Finding Broken Gates in Quantum Circuits: Exploitng Hybrid Machine Learning, Quantum Information Processing, Springer US, New York. vol.1 19 No. 8 Jul. 3, 2020.
(Continued)

*Primary Examiner* — Xuyang Xia
(74) *Attorney, Agent, or Firm* — Patterson + Sheridan, LLP

(57) ABSTRACT

A method of performing computation using a hybrid quantum-classical computing system including a classical computer, a system controller, and a quantum processor includes identifying a computational problem to be solved and a quantum algorithm to be used to solve the computational problem, detecting one or more faulty two-qubit gates among a plurality of two-qubit gates that can be applied to pairs of qubits in the quantum processor, compiling a computational task to solve the computational problem based on the quantum algorithm into a series of logic gates, including single-qubit gates and two-qubit gates that exclude the detected one or more faulty two-qubit gates, executing the series of logic gates on the quantum processor, measuring one or more of the qubits in the quantum processor, and outputting a solution to the identified computational problem derived from the measured results of the one or more of the qubits in the quantum processor.

17 Claims, 7 Drawing Sheets

(51) Int. Cl.
  *G06N 10/20* (2022.01)
  *G06N 10/60* (2022.01)

(56) References Cited

U.S. PATENT DOCUMENTS

| | | | |
|---|---|---|---|
| 2018/0144262 A1* | 5/2018 | Roetteler | G06N 10/70 |
| 2018/0260732 A1* | 9/2018 | Bloom | G06N 10/70 |
| 2021/0142202 A1* | 5/2021 | Murali | G01R 31/2837 |
| 2021/0294680 A1* | 9/2021 | Palmer Da Silva | G06F 11/004 |

OTHER PUBLICATIONS

International Search Report dated Mar. 7, 2023 for Application No. PCT/US2022/029756.
F. Arute et al., "Quantum supremacy using a programmable superconducting processor," Nature, vol. 574, No. 7779, pp. 505-510, Oct. 2019.
C. J. Ballance et al., "High-fidelity quantum logic gates using trapped-ion hyperfine qubits," Phys. Rev. Lett., vol. 117, p. 060504, Aug. 2016.
R. Blümel et al., "Power-optimal, stabilized entangling gate between trapped-ion qubits," npj Quantum Inf 7, 147, 2021.
R. Blumel et al., "Efficient stabilized two-qubit gates on a trapped-ion quantum computer," Phys. Rev. Lett., vol. 126, p. 220503, Jun. 2021.
J.-S. Chen et al., "Efficient- sideband-cooling protocol for long trapped-ion chains," Phys. Rev. A, vol. 102, p. 043110, Oct. 2020.
S. Crain et al., "High-speed, low-crosstalk detection of a trapped 171Yb+ ion ancilla qubit using superconducting hanowire single photon detectors," Communications Physics, 2, 97, 2019.
J. Emerson et al., "Scalable noise estimation with random unitary operators," Journal of Optics B: Quantum and Semiclassical Optics, vol. 7, No. 10, pp. S347-S352, Sep. 2005.
A. Erhard et al., "Characterizing large-scale quantum computers via cycle benchmarking," Nature Communications, vol. 10, No. 1, p. 1-7, Nov. 2019.
E. Farhi et al., "A quantum approximate optimization algorithm," arXiv:1411.4028, 2014.
J. P. Gaebler et al., "High-fidelity universal gate set for 9Be+ ion qubits," Phys. Rev. Lett., vol. 117, p. 060505, Aug. 2016.
T. J. Green et al., "Phase-modulated decoupling and error suppression in qubit-oscillator systems," Phys. Rev. Lett., vol. 114, p. 120502, Mar. 2015.
N. Grzesiak et al., "Efficient arbitrary simultaneously entangling gates on a trapped-ion quantum computer," Nature Communications, vol. 11, No. 1, pp. 1-6, Jun. 2020.
T. P. Harty et al., "High-fidelity preparation, gates, memory, and readout of a trapped-ion quantum bit," Phys. Rev. Lett., vol. 113, p. 220501, Nov. 2014.
Honeywell, 2021, https://www.honeywell.com/en-us/company/quantum (Accessed May 20, 2021).
IBM, 2021, https://www.ibm.com/quantum-computing/ (Accessed May 20, 2021).
IonQ, "Ionq announces third quarter 2021 financial results," 2021, https://www.businesswire.com/news/home/20211115006227/en/ (Accessed Nov. 15, 2021).
A. Kan and Y. Nam, "Lattice Quantum Chromodynamics and Electrodynamics on a Universal Quantum Computer," arXiv:2107.12769.
L. Lao et al., "Designing calibration and expressivity-efficient instruction sets for quantum computing," 2021 ACM/IEEE 48th Annual International Symposium on Computer Architecture (ISCA), Jun. 2021.
A. C. Lee et al., "Engineering large stark shifts for control of individual clock state qubits," Phys. Rev. A, vol. 94, p. 042308, Oct. 2016.
J. Lee et al., "Even more efficient quantum computations of chemistry through tensor hypercontraction," PRX Quantum, vol. 2, p. 030305, Jul. 2021.

P. H. Leung et al., "Robust 2-qubit gates in a linear ion crystal using a frequency-modulated driving force," Physical Review Letters, vol. 120, No. 2, p. 020501, Jan. 2018.
M. Li et al., "Generalized Hamiltonian to describe imperfections in ion-light interaction," Physical Review A, vol. 102, No. 6, p. 062616, Dec. 2020.
N. M. Linke et al., "Experimental comparison of two quantum computing architectures," Proceedings of the National Academy of Sciences, vol. 114, No. 13, p. 3305-3310, Mar. 2017.
T. Lubinski et al., "Application-oriented performance benchmarks for quantum computing," times2021.
A. Maksymov et al., "Optimal calibration of gates in trapped-ion quantum computers," Quantum Science and Technology, vol. 6, No. 3, p. 034009, Jun. 2021.
D. Maslov, "Basic circuit compilation techniques for an ion-trap quantum machine," New Journal of Physics, vol. 19, No. 2, p. 023035, Feb. 2017.
D. Maslov et al., "An outlook for quantum computing [point of view]," Proc. IEEE, vol. 107, No. 1, pp. 5-10, 2019.
J. T. Merrill and K. R. Brown, "Progress in compensating pulse sequences for quantum computation," arXive: 1203.6392, 2012.
J. T. Merrill et al., "Transformed composite sequences for improved qubit addressing," Phys. Rev. A, vol. 90, p. 040301, Oct. 2014.
Y. S. Nam and R. Blumel, "Analytical formulas for the performance scaling of quantum processors with a large number of defective gates," Phys. Rev. A, vol. 92, p. 042301, Oct. 2015.
Y. Nam and D. Maslov, "Low-cost quantum circuits for classically intractable instances of the Hamiltonian dynamics simulation problem," npj Quantum Information, vol. 5, No. 1, pp. 1-8, May 2019.
Y. Nam et al., "Automated optimization of large quantum circuits with continuous parameters," npj Quantum Information, vol. 4, No. 1, pp. 1-12, May 2018.
W. Paul, "Electromagnetic traps for charged and neutral particles," Rev. Mod. Phys., vol. 62, pp. 531-540, Jul. 1990.
A. Peruzzo et al., "A variational eigenvalue solver on a photonic quantum processor," Nature Communications, vol. 5, No. 1, pp. 1-7, Jul. 2014.
J. M. Pino et al., "Demonstration of the trapped-ion quantum CCD computer architecture," Nature, vol. 592, No. 7853, pp. 209-213, Apr. 2021.
Rigetti, 2021, https://www.rigetti.com (Accessed May 20, 2021).
C. Shen and L.-M. Duan, "Correcting detection errors in quantum state engineering through data processing," New J. Phys., vol. 14, No. 5, p. 053053, May 2012.
Y. Shi, "Both toffoli and controlled-not need little help to do universal quantum computing," Quantum Info. Comput., vol. 3, No. 1, p. 84-92, Jan. 2003.
P. W. Shor, "Polynomial-time algorithms for prime factorization and discrete logarithms on a quantum computer," SIAM Journal on Computing, vol. 26, No. 5, p. 1484-1509, Oct. 1997.
A. Sørensen and K. Mølmer, "Quantum computation with ions in thermal motion," Phys. Rev. Lett., vol. 82, pp. 1971-1974, Mar. 1999.
A. Sørensen and K. Mølmer, "Entanglement and quantum computation with ions in thermal motion," Phys. Rev. A, vol. 62, p. 022311, Jul. 2000.
P. Wang et al., "Single ion qubit with estimated coherence time exceeding one hour," Nature Communications, vol. 12, No. 1, Jan. 2021.
K. Wright et al., "Benchmarking an 11-qubit quantum computer," Nature Communications, vol. 10, No. 1, pp. 1-6, Nov. 2019.
Y. Wu et al., "Noise analysis for high-fidelity quantum entangling gates in an anharmonic linear paul trap," Phys. Rev. A, vol. 97, p. 062325, Jun. 2018.
E. Y. Zhu et al., "Generative quantum learning of joint probability distribution functions," arXiv:2109.06315, 2021.
S.-L. Zhu et al., "Trapped ion quantum computation with transverse phonon modes," Physical Review Letters, vol. 97, No. 5, p. 050505, Aug. 2006.

* cited by examiner

DEBUGGING OF QUANTUM CIRCUITS

CROSS-REFERENCE TO RELATED APPLICATIONS

This application claims the benefit to U.S. Provisional Application No. 63/191,218, filed May 20, 2021, which is incorporated by reference herein.

BACKGROUND

Field

Embodiments described herein are generally related to a method of performing computation in a hybrid computing system, and more specifically, to a method of debugging a quantum circuit in a hybrid computing system.

Description of the Related Art

Quantum computers have been shown to improve the performance of certain computational tasks when compared to what conventional (classical) computers can do, including hard optimization problems and sensitive cryptography tasks. Such computational tasks require, when performed on a quantum computer, an improved uptime that can be attained by improving system stability, accelerating maintenance operations, and debugging quantum circuits to be executed on the quantum computer, in order to provide an accurate and useful outcome.

Debugging is a process of detecting and removing of existing and potential errors (also called as 'bugs') in a circuit (i.e., a series of gate operations) that can cause an error in a computation that is made using the circuit. However, debugging quantum circuits is different from debugging very large-scale integration (VLSI) circuits in classical computers due to differences between qubits, representing "0" and "1" states, in quantum computers and bits, representing "0" and "1" in classical computers. For example, quantum computers are tested by feeding a quantum state in which all qubits are prepared in "0" state to a variety of test quantum circuits and measuring the quantum state repeatedly.

Therefore, there is a need for a systematic and efficient method for debugging quantum circuits to improve the error rate of a quantum computer.

SUMMARY

Embodiments of the present disclosure provide a method of performing computation using a hybrid quantum-classical computing system including a classical computer, a system controller, and a quantum processor. The method includes identifying, by use of the classical computer, a computational problem to be solved and a quantum algorithm to be used to solve the computational problem, detecting, by use of the classical computer and the system controller, one or more faulty two-qubit gates among a plurality of two-qubit gates that can be applied to pairs of qubits in the quantum processor, compiling, by use of the classical computer, a computational task to solve the computational problem based on the quantum algorithm into a series of logic gates, including a plurality of single-qubit gates and two-qubit gates of the plurality of two-qubit gates that exclude the detected one or more faulty two-qubit gates, executing, by the use of the system controller, the series of logic gates on the quantum processor, measuring, by the use of the system controller, one or more of the qubits in the quantum processor, and outputting, by use of the classical computer, a solution to the identified computational problem derived from the measured results of the one or more of the qubits in the quantum processor.

Embodiments of the present disclosure also provide a hybrid quantum-classical computing system. The hybrid quantum-classical computing system includes a quantum processor including a group of trapped ions, each trapped ion of the group of trapped ions having two hyperfine states defining a qubit, one or more lasers configured to emit a laser beam, which is provided to trapped ions in the quantum processor, a classical computer, and a system controller configured to control the emission of the laser beam from the one or more lasers to be applied to the trapped ions in the quantum processor. The classical computer and the system controller are configured to perform operations including identifying, by use of the classical computer, a computational problem to be solved and a quantum algorithm to be used to solve the computational problem, detecting, by use of the classical computer and the system controller, one or more faulty two-qubit gates among a plurality of two-qubit gates that can be applied to pairs of qubits in the quantum processor, compiling, by use of the classical computer, a computational task to solve the computational problem based on the quantum algorithm into a series of logic gates, including a plurality of single-qubit gates and two-qubit gates of the plurality of two-qubit gates that exclude the detected one or more faulty two-qubit gates, executing, by the use of the system controller, the series of logic gates on the quantum processor, measuring, by the use of the system controller, one or more of the qubits in the quantum processor, and outputting, by use of the classical computer, a solution to the identified computational problem derived from the measured results of the one or more of the qubits in the quantum processor.

Embodiments of the present disclosure further provide a hybrid quantum-classical computing system. The hybrid quantum-classical computing system includes a classical computer, a quantum processor, a system controller, and non-volatile memory having a number of instructions stored therein. The number of instructions, when executed by one or more processors, causes the hybrid quantum-classical computing system to perform operations including identifying, by use of the classical computer, a computational problem to be solved and a quantum algorithm to be used to solve the computational problem, detecting, by use of the classical computer and the system controller, one or more faulty two-qubit gates among a plurality of two-qubit gates that can be applied to pairs of qubits in the quantum processor, compiling, by use of the classical computer, a computational task to solve the computational problem based on the quantum algorithm into a series of logic gates, including a plurality of single-qubit gates and two-qubit gates of the plurality of two-qubit gates that exclude the detected one or more faulty two-qubit gates, executing, by the use of the system controller, the series of logic gates on the quantum processor, measuring, by the use of the system controller, one or more of the qubits in the quantum processor, and outputting, by use of the classical computer, a solution to the identified computational problem derived from the measured results of the one or more of the qubits in the quantum processor.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
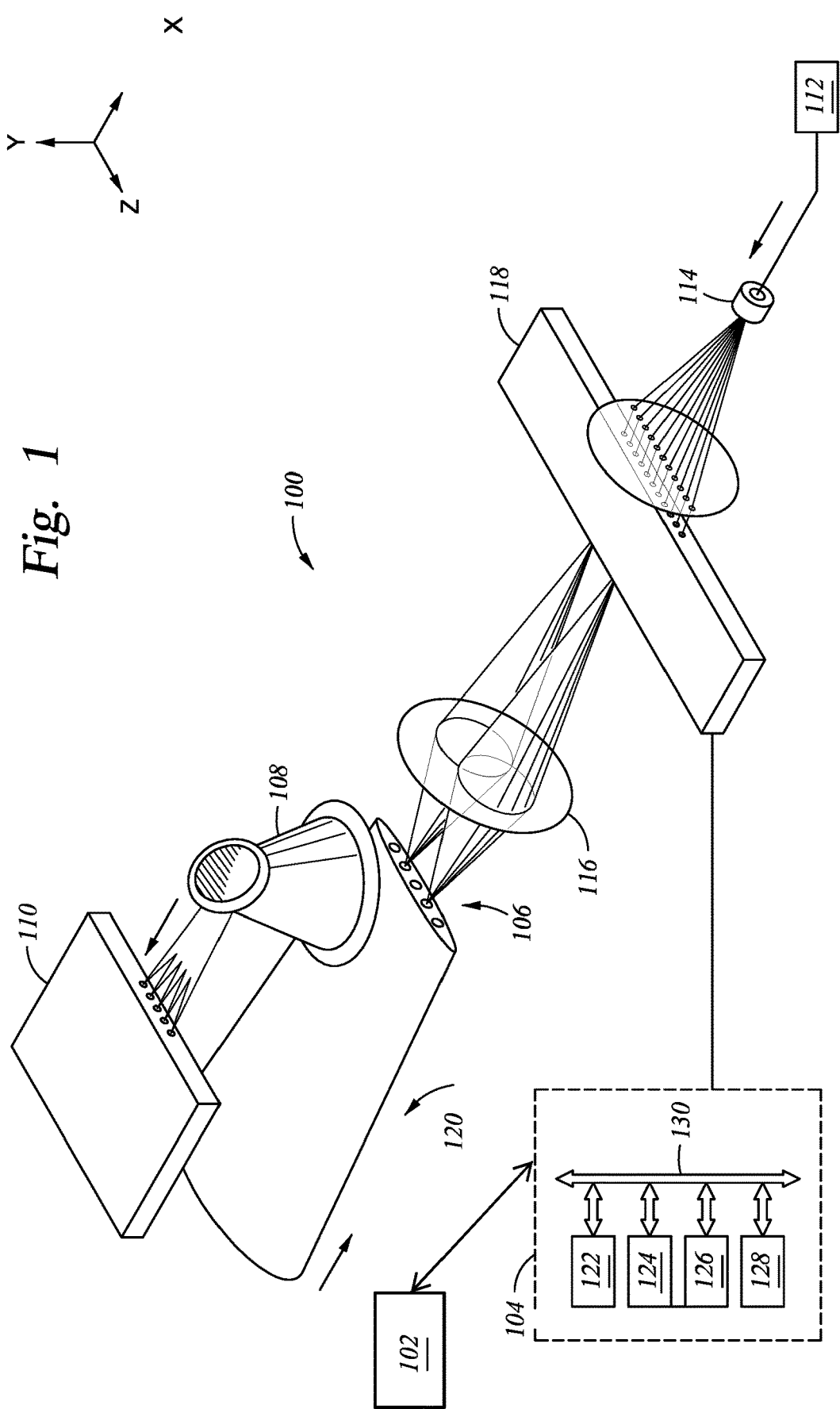
FIG. 1 is a schematic partial view of an ion trap quantum computing system according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a method of performing computation in a hybrid computing system, and more specifically, to a method of debugging a quantum circuit in a hybrid computing system.

A hybrid quantum-classical computing system may include a classical computer, a system controller, and a quantum processor. As used herein, the terms "quantum computer" and "quantum processor" may be used interchangeably to refer to the hardware/software components that perform a quantum computation. A quantum circuit is a series of gate operations that are executed, by the system controller, on the quantum processor.

The quantum processor can be made from different qubit technologies. In one example, for ion trap technologies, the quantum processor includes trapped ions that are coupled with various hardware, including lasers to manipulate internal hyperfine states (qubit states) of the trapped ions, photomultiplier tubes (PMTs), or other type of imaging devices, to read-out the internal hyperfine states (qubit states) of the trapped ions. The system controller receives from the classical computer instructions for controlling the quantum processor, and controls various hardware associated with controlling any and all aspects used to execute the instructions for controlling the quantum processor. The system controller also returns a read-out of the quantum processor and thus output of results of the computation(s) performed by the quantum processor to the classical computer.

The methods described herein include identifying a faulty two-qubit gate among $\sim N^2$ two-qubit gates in a quantum processor having N qubits by only 3 $\log_2 N-1$ tests.

General Hardware Configurations

FIG. 1 is a schematic partial view of an ion trap quantum computing system 100, or simply the system 100, according to one embodiment. The system 100 can be representative of a hybrid quantum-classical computing system. The system 100 includes a classical (digital) computer 102 and a system controller 104. Other components of the system 100 shown in FIG. 1 are associated with a quantum processor, including a group 106 of trapped ions (i.e., five shown as circles about equally spaced from each other) that extend along the Z-axis. Each ion in the group 106 of trapped ions is an ion having a nuclear spin I and an electron spin s such that the difference between the nuclear spin I and the electron spin s is zero, such as a positive ytterbium ion, $^{171}Yb^+$, a positive barium ion $^{133}Ba^+$, a positive cadmium ion $^{111}Cd^+$ or $^{113}Cd^+$, which all have a nuclear spin I=½ and the $^2S_{1/2}$ hyperfine states. In some embodiments, all ions in the group 106 of trapped ions are the same species and isotope (e.g., $^{171}Yb^+$). In some other embodiments, the group 106 of trapped ions includes one or more species or isotopes (e.g., some ions are $^{171}Yb^+$ and some other ions are $^{133}Ba^+$). In yet additional embodiments, the group 106 of trapped ions may include various isotopes of the same species (e.g., different isotopes of Yb, different isotopes of Ba). The ions in the group 106 of trapped ions are individually addressed with separate laser beams. The classical computer 102 includes a central processing unit (CPU), memory, and support circuits (or I/O) (not shown). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 108, such as an objective lens with a numerical aperture (NA), for example, of 0.37, collects fluorescence along the Y-axis from the ions and maps each ion onto a multi-channel photo-multiplier tube (PMT) 110 (or some other imaging device) for measurement of individual ions. Raman laser beams from a laser 112, which are provided along the X-axis, perform operations on the ions. A diffractive beam splitter 114 creates an array of Raman laser beams 116 that are individually switched using a multi-channel acousto-optic modulator (AOM) 118. The AOM 118 is configured to selectively act on individual ions by individually controlling emission of the Raman laser beams 116. A global Raman laser beam 120, which is non-copropagating to the Raman laser beams 116, illuminates all ions at once from a different direction. In some embodiments, rather than a single global Raman laser beam 120, individual Raman laser beams (not shown) can be used to each illuminate individual ions. The system controller (also referred to as an "RF controller") 104 controls the AOM 118 and thus controls intensities, timings, and phases of laser pulses to be applied to trapped ions in the group 106 of trapped ions. The CPU 122 is a processor of the system controller 104. The ROM 124 stores various programs and the RAM 126 is the working memory for various programs and data. The storage unit 128 includes a nonvolatile memory, such as a hard disk drive (HDD) or a flash memory, and stores various programs even if power is turned off. The CPU 122, the ROM 124, the RAM 126, and the storage unit 128 are interconnected via a bus 130. The system controller 104 executes a control program which is stored in the ROM 124 or the storage unit 128 and uses the RAM 126 as a working area. The control program will include software applications that include program code that may be executed by the CPU 122 in order to perform various functionalities associated with receiving and analyzing data and controlling any and all aspects of the methods and hardware used to implement and operate the ion trap quantum computing system 100 discussed herein.

Figure 2:
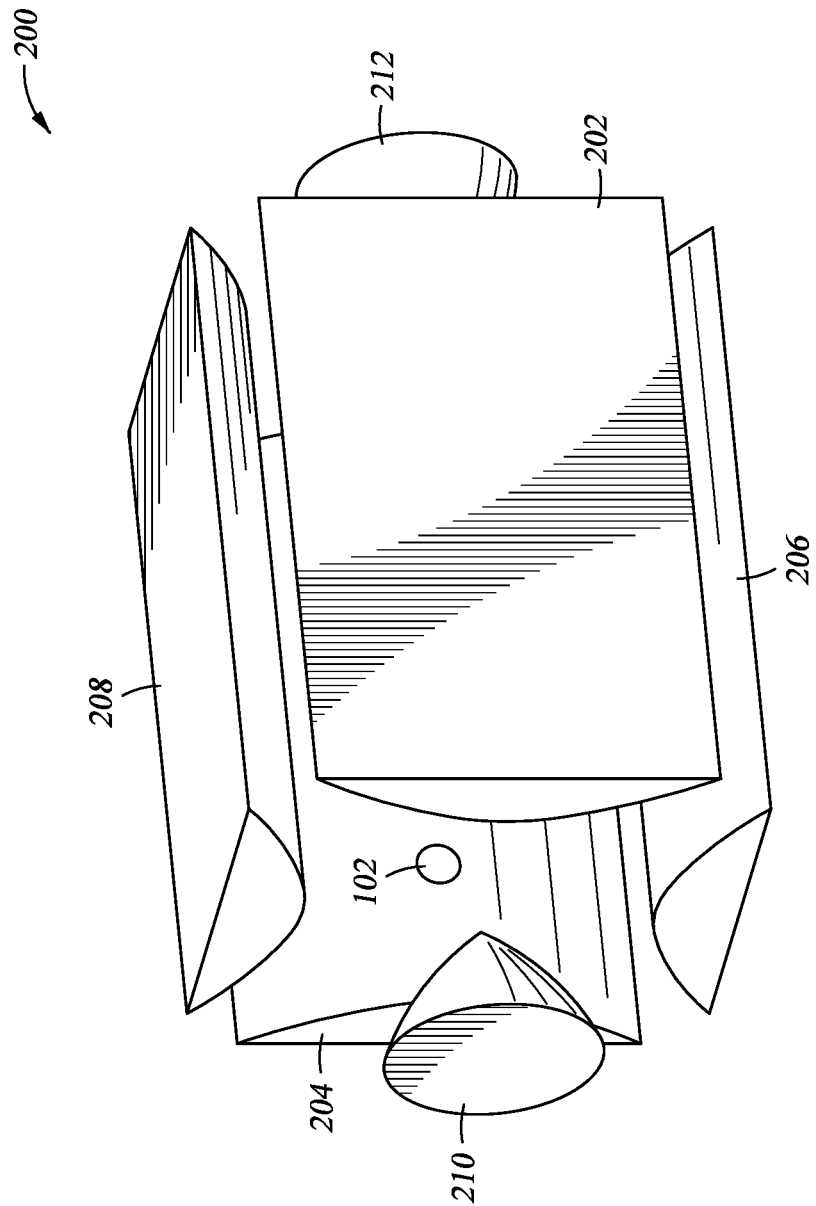
FIG. 2 depicts a schematic view of an ion trap for confining ions in a group according to one embodiment.

FIG. 2 depicts a schematic view of an ion trap 200 (also referred to as a Paul trap) for confining ions in the group 106 according to one embodiment. The confining potential is exerted by both static (DC) voltage and radio frequency (RF) voltages. A static (DC) voltage $V_S$ is applied to end-cap electrodes 210 and 212 to confine the ions along the Z-axis (also referred to as an "axial direction" or a "longitudinal direction"). The ions in the group 106 are nearly evenly distributed in the axial direction due to the Coulomb interaction between the ions. In some embodiments, the ion trap 200 includes four hyperbolically-shaped electrodes 202, 204, 206, and 208 extending along the Z-axis.

During operation, a sinusoidal voltage $V_1$ (with an amplitude $V_{RF}/2$) is applied to an opposing pair of the electrodes 202, 204 and a sinusoidal voltage $V_2$ with a phase shift of 180° from the sinusoidal voltage $V_1$ (and the amplitude $V_{RF}/2$) is applied to the other opposing pair of the electrodes 206, 208 at a driving frequency $\omega_{RF}$, generating a quadrupole potential. In some embodiments, a sinusoidal voltage is only applied to one opposing pair of the electrodes 202, 204, and the other opposing pair 206, 208 is grounded. The quadrupole potential creates an effective confining force in the X-Y plane perpendicular to the Z-axis (also referred to as a "radial direction" or "transverse direction") for each of the trapped ions, which is proportional to a distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as secular motion) with a restoring force towards the saddle point in the radial direction and can be modeled by spring constants $k_x$ and $k_y$, respectively. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

Although not shown, a different type of trap is a microfabricated trap chip in which a similar approach as the one described above is used to hold or confine ions or atoms in place above a surface of the micro-fabricated trap chip. Laser beams, such as the Raman laser beams described above, can be applied to the ions or atoms as they sit just above the surface.

Figure 3:
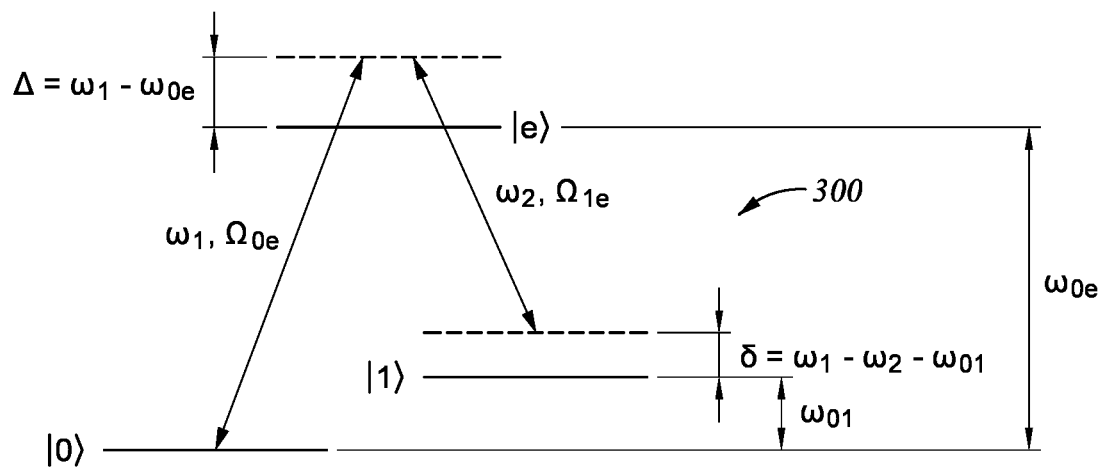
FIG. 3 depicts a schematic energy diagram of each ion in a group of trapped ions according to one embodiment.

FIG. 3 depicts a schematic energy diagram 300 of each ion in the group 106 of trapped ions according to one embodiment. Each ion in the group 106 of trapped ions is an ion having a nuclear spin I and an electron spin s such that a difference between the nuclear spin I and the electron spin s is zero. In one example, each ion may be a positive Ytterbium ion, $^{171}\text{Yb}^+$, which has a nuclear spin I=½ and the $^2S_{1/2}$ hyperfine states (i.e., two electronic states) with an energy split corresponding to a frequency difference (referred to as a "carrier frequency") of $\omega_{01}/2\pi$=12.642812 GHz. In other examples, each ion may be a positive barium ion $^{133}\text{Ba}^+$, a positive cadmium ion $^{111}\text{Cd}^+$ or $^{113}\text{Cd}^+$, which all have a nuclear spin I=½ and the $^2S_{1/2}$ hyperfine states. A qubit is formed with the two hyperfine states, denoted as $|0\rangle$ and $|1\rangle$, where the hyperfine ground state (i.e., the lower energy state of the $^2S_{1/2}$ hyperfine states) is chosen to represent $|0\rangle$. Hereinafter, the terms "hyperfine states," "internal hyperfine states," and "qubits" may be interchangeably used to represent $|0\rangle$ and $|1\rangle$. Each ion may be cooled (i.e., kinetic energy of the ion may be reduced) to near the motional ground state $|0\rangle_m$ for any motional mode m with no phonon excitation (i.e., $n_{ph}$=0) by known laser cooling methods, such as Doppler cooling or resolved sideband cooling, and then the qubit state prepared in the hyperfine ground state $|0\rangle$ by optical pumping. Here, $|0\rangle$ represents the individual qubit state of a trapped ion whereas $|0\rangle_m$ with the subscript m denotes the motional ground state for a motional mode m of a group 106 of trapped ions.

An individual qubit state of each trapped ion may be manipulated by, for example, a mode-locked laser at 355 nanometers (nm) via the excited $^2P_{1/2}$ level (denoted as $|e\rangle$). As shown in FIG. 3, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between $|0\rangle$ and $|e\rangle$, as illustrated in FIG. 3. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency $\Delta$ is much larger than a two-photon transition detuning frequency (also referred to simply as "detuning frequency") $\delta=\omega_1-\omega_2-\omega_{01}$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|e\rangle$ and between states $|0\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$ where $\Omega_{0e}$ and $\Omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which have stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions (Be$^+$, Ca$^+$, Sr$^+$, Mg+, and Ba$^+$) or transition metal ions (Zn$^+$, Hg$^+$, Cd$^+$).

Figure 4:
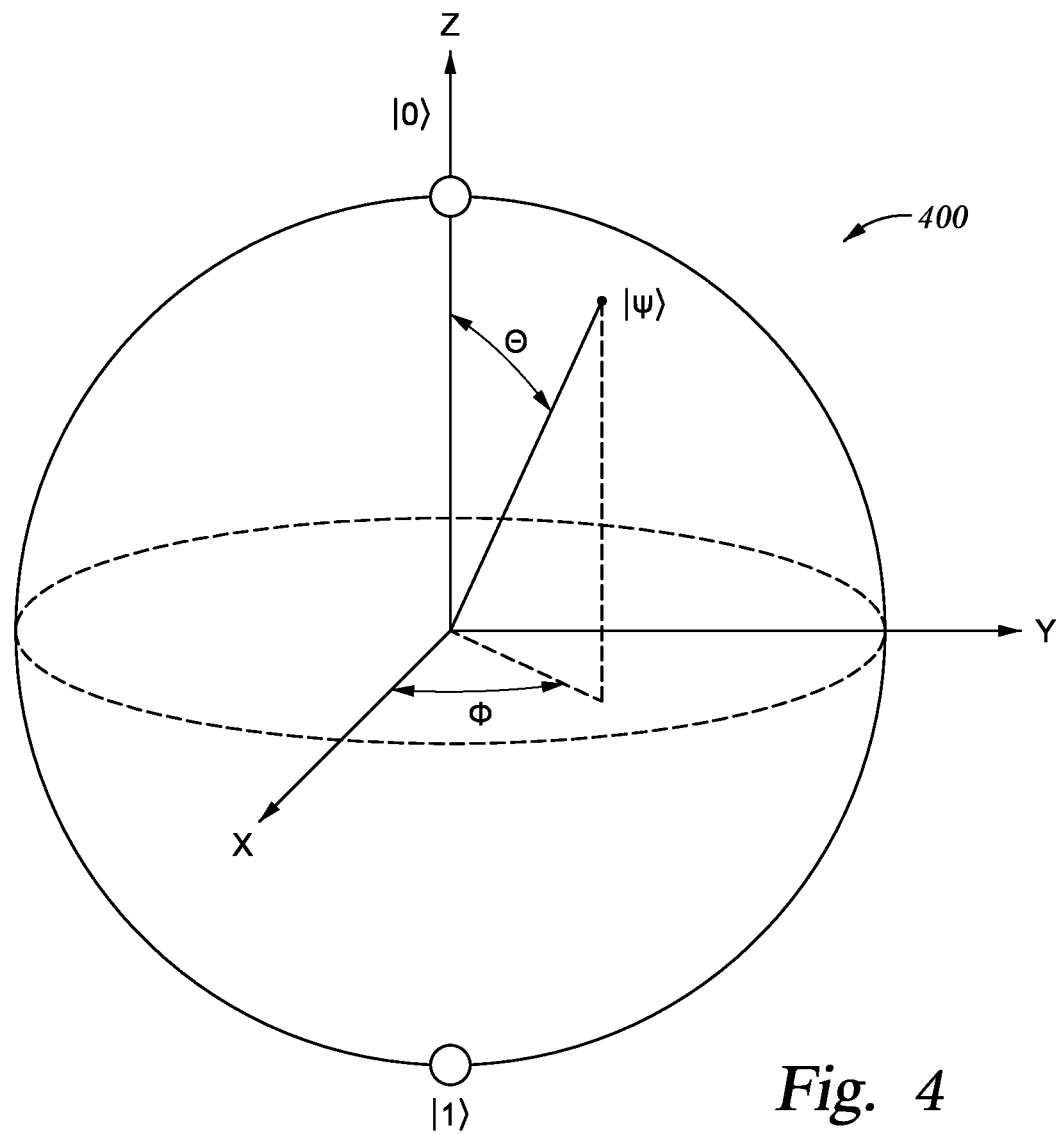
FIG. 4 depicts a qubit state of an ion represented as a point on a surface of the Bloch sphere.

FIG. 4 is provided to help visualize a qubit state of an ion is represented as a point on a surface of the Bloch sphere 400 with an azimuthal angle $\phi$ and a polar angle $\theta$. Application of the composite pulse as described above, causes Rabi flopping between the qubit state $|0\rangle$ (represented as the north pole of the Bloch sphere) and $|1\rangle$ (the south pole of the Bloch sphere) to occur. Adjusting time duration and amplitudes of the composite pulse flips the qubit state from $|0\rangle$ to $|1\rangle$ (i.e., from the north pole to the south pole of the Bloch sphere), or the qubit state from $|1\rangle$ to $|0\rangle$ (i.e., from the south pole to the north pole of the Bloch sphere). This application of the composite pulse is referred to as a "Tr-pulse". Further, by adjusting time duration and amplitudes of the composite pulse, the qubit state $|0\rangle$ may be transformed to a superposition state $|0\rangle+|1\rangle$, where the two-qubit states $|0\rangle$ and $|1\rangle$ are added and equally-weighted in-phase (a normalization factor of the superposition state is omitted hereinafter for convenience) and the qubit state $|1\rangle$ to a superposition state $|0\rangle-|1\rangle$, where the two-qubit states $|0\rangle$ and $|1\rangle$ are added equally-weighted but out of phase. This application of the composite pulse is referred to as a "$\pi/2$-pulse". More generally, a superposition of the two-qubits states $|0\rangle$ and $|1\rangle$ that are added and equally-weighted is represented by a point that lies on the equator of the Bloch sphere. For example, the superposition states $|0\rangle+|1\rangle$ correspond to points on the equator with the azimuthal angle $\phi$ being zero and $\pi$, respectively. The superposition states that correspond to points on the equator with the azimuthal angle $\phi$ are denoted as $|0\rangle+e^{i\phi}|0\rangle$ (e.g., $|0\rangle \pm i|1\rangle$ for $\phi=\pm\pi/2$). Transformation between two points on the equator (i.e., a rotation about the Z-axis on the Bloch sphere) can be implemented by shifting phases of the composite pulse.

Entanglement Formation

Figure 5A:
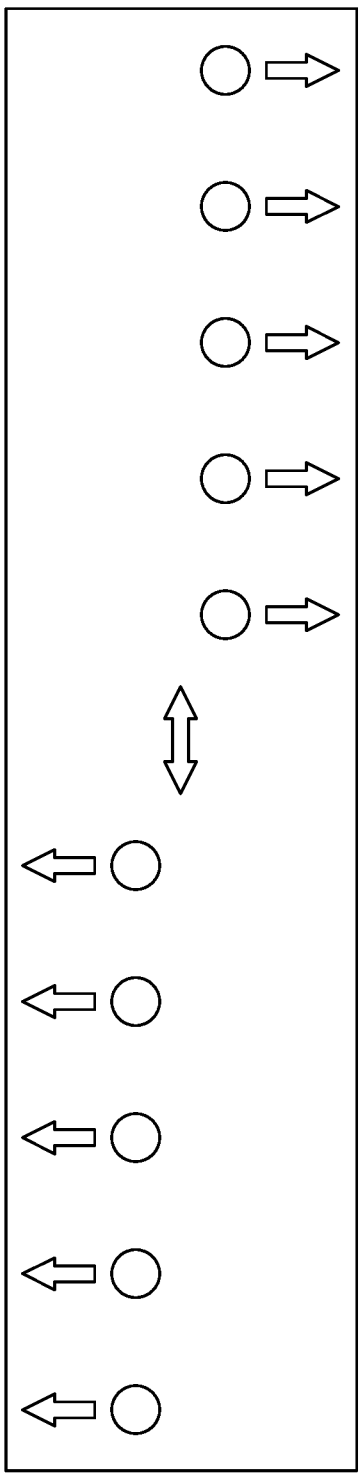
FIGS. 5A, 5B, and 5C depict a few schematic collective transverse motional mode structures of a group of five trapped ions.
Figure 5B:
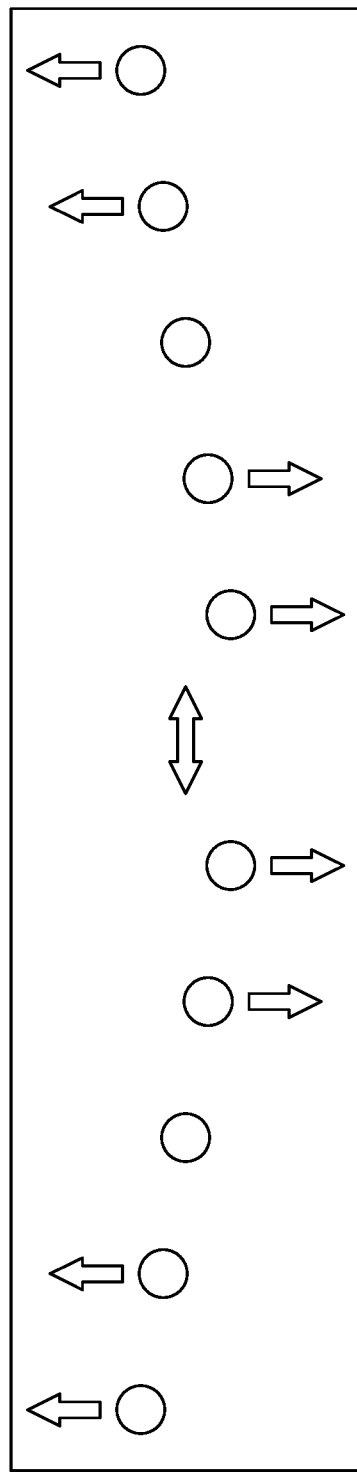
Figure 5C:
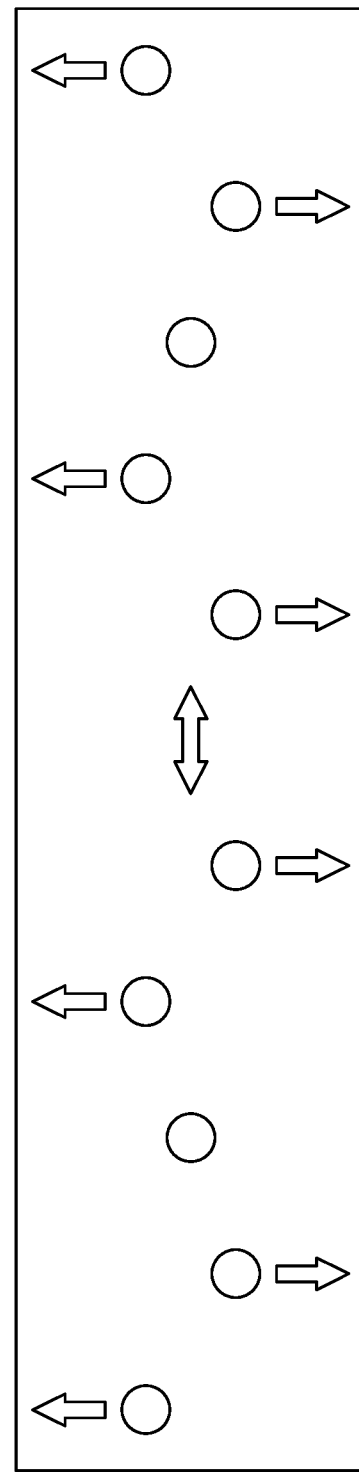

FIGS. 5A, 5B, and 5C depict a few schematic structures of collective transverse motional modes (also referred to simply as "motional mode structures") of a group 106 of five trapped ions, for example. Here, the confining potential due to a static voltage $V_S$ applied to the end-cap electrodes 210 and 212 is weaker compared to the confining potential in the radial direction. The collective motional modes of the group 106 of trapped ions in the transverse direction are determined by the Coulomb interaction between the trapped ions combined with the confining potentials generated by the ion trap 200. The trapped ions undergo collective transversal motions (referred to as "collective transverse motional modes," "collective motional modes," or simply "motional modes"), where each mode has a distinct energy (or equivalently, a frequency) associated with it. A motional mode having the m-th lowest energy is hereinafter referred to as $|n_{ph}\rangle_m$, where $n_{ph}$ denotes the number of motional quanta (in units of energy excitation, referred to as phonons) in the motional mode, and the number of motional modes M in a given transverse direction is equal to the number of trapped ions in the group 106. FIGS. 5A-5C schematically illustrates examples of different types of collective transverse motional modes that may be experienced by five trapped ions that are positioned in a group 106. FIG. 5A is a schematic view of a common motional mode $|n_{ph}\rangle_M$ having the highest energy, where M is the number of motional modes. In the common motional mode $|n\rangle_m$, all ions oscillate in phase in the transverse direction. FIG. 5B is a schematic view of a tilt motional mode $|n_{ph}\rangle_{M-1}$ which has the second highest energy. In the tilt motional mode, ions on opposite ends move out of phase in the transverse direction (i.e., in opposite directions). FIG. 5C is a schematic view of a higher-order motional mode $|n_{ph}\rangle_{M-3}$ which has a lower energy than that of the tilt motional mode $|n_{ph}\rangle_{M-3}$, and in which the ions move in a more complicated mode pattern.

It should be noted that the particular configuration described above is just one among several possible examples of a trap for confining ions according to the present disclosure and does not limit the possible configurations, specifications, or the like, according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions, or coupled by photon interconnects. A trap may also be an array of individual trapping regions arranged closely to each other on a micro-fabricated ion trap chip, such as the one described above. In some embodiments, the quadrupole potential has a spatially varying DC component in addition to the RF component described above.

Figure 6A:
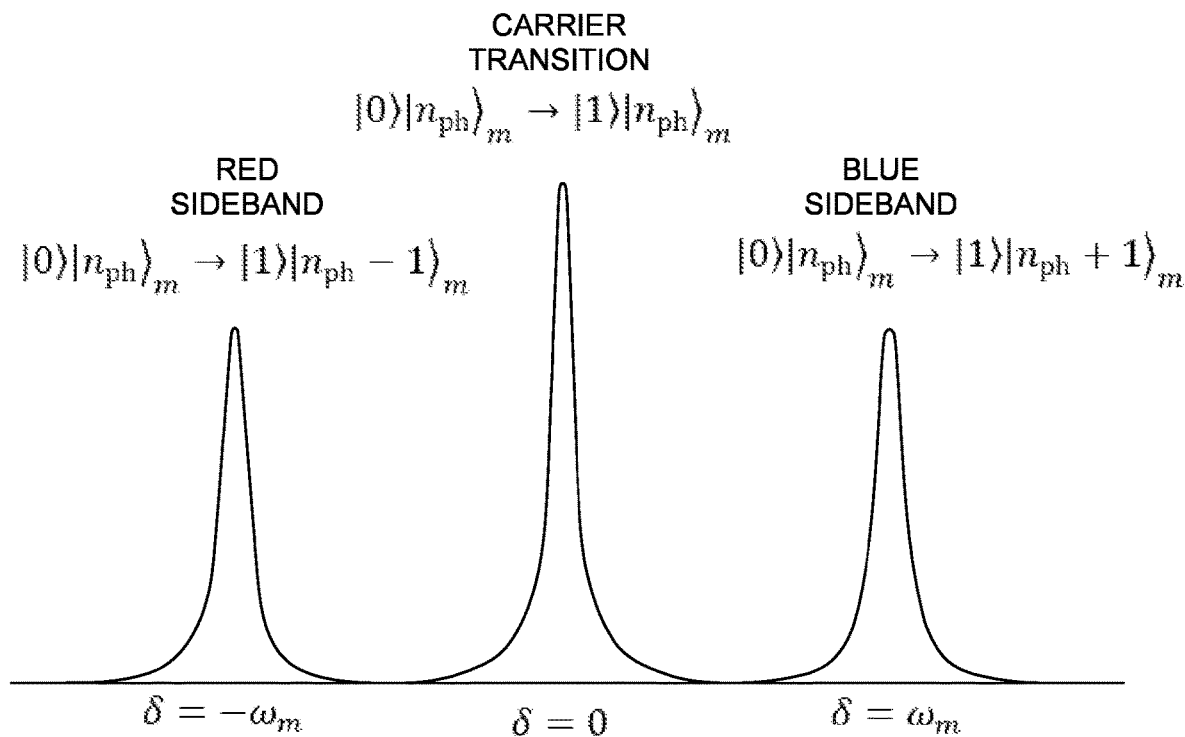
FIGS. 6A and 6B depict schematic views of motional sideband spectrum of each ion and a motional mode according to one embodiment.
Figure 6B:
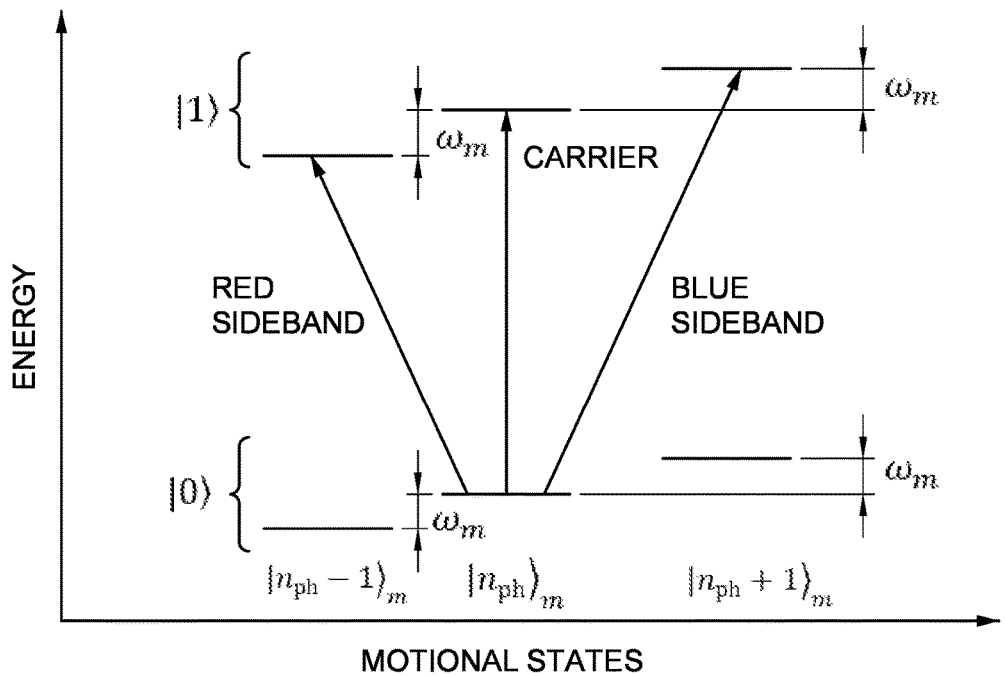

In an ion trap quantum computer, the motional modes may act as a data bus to mediate entanglement between two-qubits and this entanglement is used to perform an XX gate operation. That is, each of the two-qubits is entangled with the motional modes, and then the entanglement is transferred to an entanglement between the two-qubits by using motional sideband excitations, as described below. FIGS. 6A and 6B schematically depict views of a motional sideband spectrum for an ion in the group 106 in a motional mode $|n_{ph}\rangle_M$ having frequency $\omega_m$ according to one embodiment. As illustrated in FIG. 6B, when the detuning frequency of the composite pulse is zero (i.e., a frequency difference between the first and second laser beams is tuned to the carrier frequency, $\delta=\omega_1-\omega_2-\omega_{01}=0$), simple Rabi flopping between the qubit states $|0\rangle$ and $|1\rangle$ (carrier transition) occurs. When the detuning frequency of the composite pulse is positive (i.e., the frequency difference between the first and second laser beams is tuned higher than the carrier frequency, $\delta=\omega_1-\omega_2-\omega_{01}=\mu>0$, referred to as a blue sideband), Rabi flopping between combined qubit-motional states $|0\rangle|n_{ph}\rangle_m$ and $|1\rangle|n_{ph}+1\rangle_m$ occurs (i.e., a transition from the m-th motional mode with n-phonon excitations denoted by $|n_{ph}\rangle_m$ to the m-th motional mode with $(n_{ph}+1)$-phonon excitations denoted by $|n_{ph}+1\rangle_m$ occurs when the qubit state $|0\rangle$ flips to $|1\rangle$). When the detuning frequency of the composite pulse is negative (i.e., the frequency difference between the first and second laser beams is tuned lower than the carrier frequency by the frequency $\omega_m$ of the motional mode $|n_{ph}\rangle_m$, $\delta=\omega_1-\omega_2-\omega_{01}=-\mu<0$, referred to as a red sideband), Rabi flopping between combined qubit-motional states $|0\rangle|n_{ph}\rangle_m$ and $|1\rangle|n_{ph}-1\rangle_m$ occurs (i.e., a transition from the motional mode $|n_{ph}\rangle_m$ to the motional mode $|n_{ph}-1\rangle_m$ with one less phonon excitations occurs when the qubit state $|0\rangle$ flips to $|1\rangle$). A $\pi/2$-pulse on the blue sideband applied to a qubit transforms the combined qubit-motional state $|0\rangle|n_{ph}\rangle_m$ into a superposition of $|0\rangle|n_{ph}\rangle_m$ and $|1\rangle|n_{ph}+1\rangle_m$. A $\pi/2$-pulse on the red sideband applied to a qubit transforms the combined qubit-motional state $|0\rangle|n_{ph}\rangle_m$ into a superposition of $|0\rangle|n_{ph}\rangle_m$ and $|1\rangle|n_{ph}-1\rangle_m$. When the two-photon Rabi frequency $\Omega(t)$ is smaller as compared to the detuning frequency $\delta=\omega_1-\omega_2-\omega_{01}=\pm\mu$, the blue sideband transition or the red sideband transition may be selectively driven. Thus, a qubit can be entangled with a desired motional mode by applying the right type of pulse, such as a $\eta/2$-pulse, which can be subsequently entangled with another qubit, leading to an entanglement between the two-qubits that is needed to perform an XX-gate operation in an ion trap quantum computer.

By controlling and/or directing transformations of the combined qubit-motional states as described above, an XX-gate operation may be performed on two qubits (i-th and j-th qubits). In general, the XX-gate operation (with maximal entanglement) respectively transforms two-qubit states $|0\rangle_i|0\rangle_j$, $|0\rangle_i|1\rangle_j$, $|1\rangle_i|0\rangle_j$, and $|1\rangle_i|1\rangle_j$ as follows:

$$|0\rangle_i|0\rangle_j \rightarrow |0\rangle_i|0\rangle_j - i|1\rangle_i|1\rangle_j$$

$$|0\rangle_i|1\rangle_j \rightarrow |0\rangle_i|1\rangle_j - i|1\rangle_i|0\rangle_j$$

$$|1\rangle_i|0\rangle_j \rightarrow -i|0\rangle_i|1\rangle_j + |1\rangle_i|0\rangle_j$$

$$|1\rangle_i|1\rangle_j \rightarrow -i|0\rangle_i|0\rangle_j + |1\rangle_i|1\rangle_j$$

For example, when the two-qubits (i-th and j-th qubits) are both initially in the hyperfine ground state $|0\rangle$ (denoted as $|0\rangle_i|0\rangle_i$) and subsequently a $\pi/2$-pulse on the blue sideband is applied to the i-th qubit, the combined state of the i-th qubit and the motional mode $|0\rangle_i|n_{ph}\rangle_m$ is transformed into a superposition of $|0\rangle_i|n_{ph}\rangle_m$ and $|1\rangle_i|n_{ph}+1\rangle_m$, and thus the combined state of the two-qubits and the motional mode is transformed into a superposition of $|0\rangle_i|0\rangle_j|n_{ph}\rangle_m$ and $|1\rangle_i|0\rangle_j|n_{ph}+1\rangle_m$. When a $\pi/2$-pulse on the red sideband is applied to the j-th qubit, the combined state of the j-th qubit and the motional mode $|0\rangle_j|n_{ph}\rangle_m$ is transformed to a superposition of $|0\rangle_j|n_{ph}\rangle_m$ and $|1\rangle_j|n_{ph}-1\rangle_m$ and the combined state $|0\rangle_i|n_{ph}+1\rangle_m$ is transformed into a superposition of $|0\rangle_j|n_{ph}+1\rangle_m$ and $|1\rangle_j|n_{ph}\rangle_m$.

Thus, applications of a $\pi/2$-pulse on the blue sideband on the i-th qubit and a $\pi/2$-pulse on the red sideband on the j-th qubit may transform the combined state of the two-qubits and the motional mode $|0\rangle_i|0\rangle_j|n_{ph}\rangle_m$ into a superposition of $|0\rangle_i|0\rangle_j|n_{ph}\rangle_m$ and $|1\rangle_i|1\rangle_j|n_{ph}\rangle_m$, the two-qubits now being in an entangled state. For those of ordinary skill in the art, it should be clear that two-qubit states that are entangled with motional mode having a different number of phonon excitations from the initial number of phonon excitations $n_{ph}$ (i.e., $|1\rangle_i|0\rangle_j|n_{ph}+1\rangle_m$ and $|0\rangle_i|1\rangle_j|n_{ph}-1\rangle_m$) can be removed by a sufficiently complex pulse sequence, and thus the combined state of the two-qubits and the motional mode after the XX-gate operation may be considered disentangled as the initial number of phonon excitations $n_{ph}$ in the m-th motional mode stays unchanged at the end of the XX-gate operation. Thus, qubit states before and after the XX-gate operation will be described below generally without including the motional modes.

More generally, the combined state of i-th and j-th qubits transformed by the application of pulses on the sidebands for duration $\tau$ (referred to as a "gate duration"), having amplitudes $\Omega^{(i)}$ and $\Omega^{(j)}$ and detuning frequency $\mu$, can be described in terms of an entangling interaction $X^{(i,j)}(\tau)$ as follows:

$$|0\rangle_i|0\rangle_j \rightarrow \cos(2\chi^{(i,j)}(\tau))|0\rangle_i|0\rangle_j - i\sin(2\chi^{(i,j)}(\tau))|1\rangle_i|1\rangle_j$$

$$|0\rangle_i|1\rangle_j \rightarrow \cos(2\chi^{(i,j)}(\tau))|0\rangle_i|1\rangle_j - i\sin(2\chi^{(i,j)}(\tau))|1\rangle_i|0\rangle_j$$

$$|1\rangle_i|0\rangle_j \rightarrow -i\sin(2\chi^{(i,j)}(\tau))|0\rangle_i|1\rangle_j + \cos(2\chi^{(i,j)}(\tau))|1\rangle_i|0\rangle_j$$

$$|1\rangle_i|1\rangle_j \rightarrow -i\sin(2\chi^{(i,j)}(\tau))|0\rangle_i|0\rangle_j + \cos(2\chi^{(i,j)}(\tau))|1\rangle_i|1\rangle_j$$

where, $$\chi^{(i,j)}(\tau) = -4\sum_{m=1}^{M} \eta_m^{(i)}\eta_m^{(j)} \int_0^\tau dt_2 \int_0^{t_2} dt_1 \Omega^{(i)}(t_2)\Omega^{(j)}(t_1)\cos(\mu t_2)\cos(\mu t_1)\sin[\omega_m(t_2-t_1)]$$

and $\eta_m^{(i)}$ is the Lamb-Dicke parameter that quantifies the coupling strength between the i-th ion and the m-th motional mode having the frequency $\omega_m$, and M is the number of the motional modes (equal to the number N of ions in the group 106).

The entanglement interaction between two-qubits described above can be used to perform an XX-gate operation. The XX-gate operation (XX gate) along with single-qubit gate operations (R gates) forms a set of gates {R, XX} that can be used to build a quantum computer that is configured to perform desired computational processes. Among several known sets of logic gates by which any quantum algorithm can be decomposed, a set of logic gates, commonly denoted as {R, XX}, is native to a quantum computing system of trapped ions described herein. Here, the R gate corresponds to manipulation of individual qubit states of trapped ions, and the XX gate (also referred to as a "two-qubit gate") corresponds to manipulation of the entanglement of two trapped ions.

To perform an XX-gate operation between i-th and j-th qubits, pulses that satisfy the condition $X^{(i,j)}(\tau)=\theta^{(i,j)}$ ($0<\theta^{(i,j)}\leq\pi/8$) (i.e., the entangling interaction $X^{(i,j)}(\tau)$ has a desired value $\theta^{(i,j)}$, referred to as condition for a non-zero entanglement interaction) are constructed and applied to the i-th and the j-th qubits. The transformations of the combined state of the i-th and the j-th qubits described above corresponds to the XX-gate operation with maximal entanglement when $\theta^{(i,j)}=\pi/8$. Amplitudes $\Omega^{(i)}(\tau)$ and $\Omega^{(j)}(\tau)$ of the pulses to be applied to the i-th and the j-th qubits are control parameters that can be adjusted to ensure a non-zero tunable entanglement of the i-th and the j-th qubits to perform a desired XX gate operation on i-th and j-th qubits.

Debugging Quantum Circuits

In the embodiments described herein, a method of performing one or more computations using a hybrid quantum-classical computing system that includes a classical computer, such as the classical computer 102, and a quantum processor, such as the group 106 of trapped ions, in the ion trap quantum computing system 100. In the method described herein, a systematic "debug" process (i.e., identifying errors in the quantum processor and removing the errors in circuits to perform the computations) is performed such that the computation can be performed with reduced errors.

Figure 7:
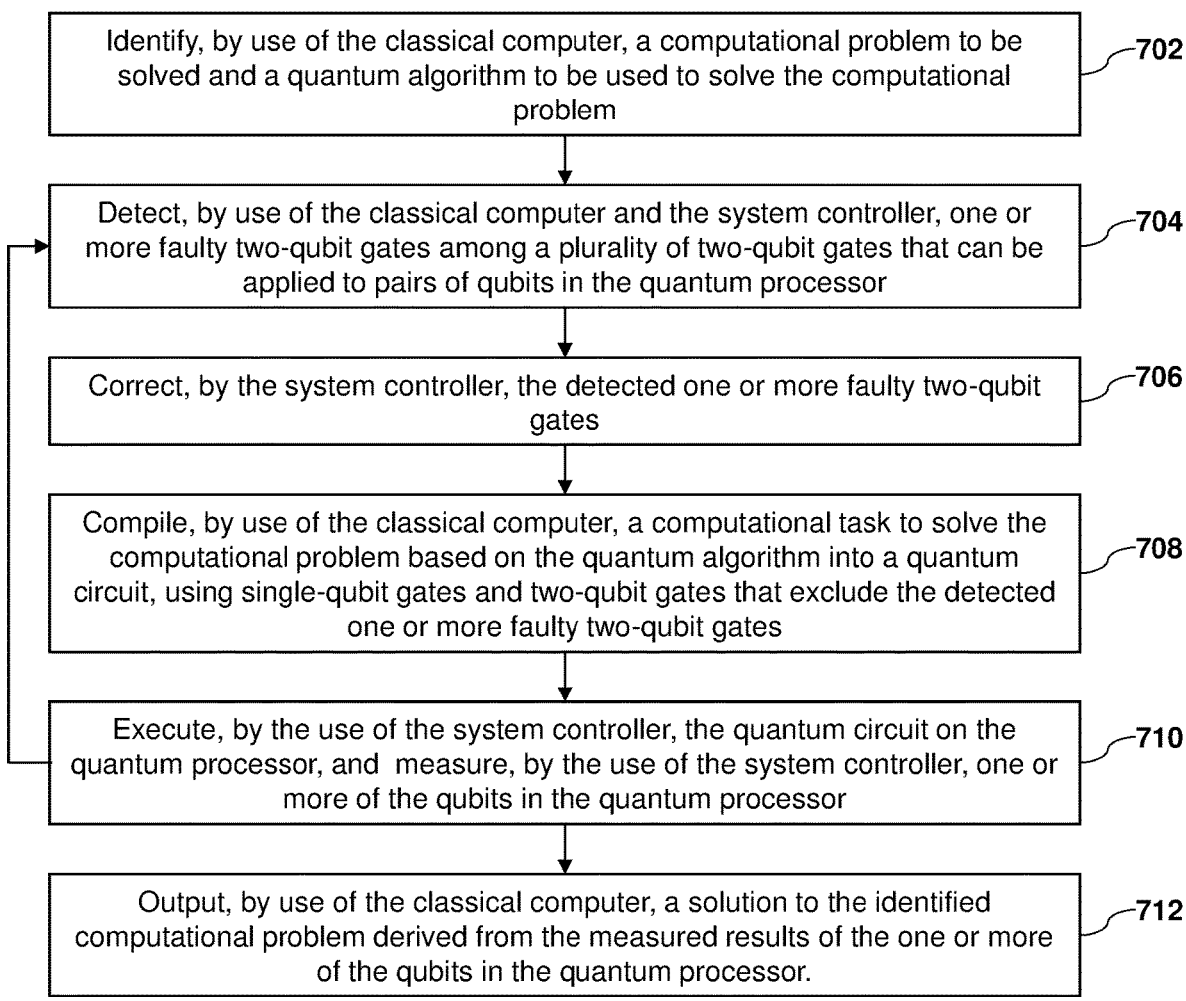
FIG. 7 depicts a flowchart illustrating a method of performing one or more computations using a hybrid quantum-classical computing system including a classical computer and a quantum processor according to one embodiment.

FIG. 7 depicts a flowchart illustrating a method 700 of performing one or more computations using a hybrid quantum-classical computing system including a classical computer and a quantum processor. In this example, the quantum processor is based on the group 106 of trapped ions, in which the two hyperfine states of each of the trapped ions form a qubit. Thus, the trapped ions form the qubits that provide the computing core of the quantum processor or quantum computer.

In block 702, by the classical computer 102, a computational problem to be solved and a quantum algorithm to be used to solve the computational problem are identified, for example, by use of a user interface, such as graphics processing unit (GPU), of the classical computer 102, or retrieved from the memory of the classical computer 102. A computational task to solve the computational problem based on the quantum algorithm is then, by the classical computer 102, decomposed and compiled into a quantum circuit by using a set of universal quantum logic gates (i.e., a series of logic gates) in block 708. Among several known sets of universal quantum logic gates, a set of universal quantum logic gates, commonly denoted as {R, XX}, is native to a quantum computing system of trapped ions described herein. Here, the R gates correspond to single-qubit gate operations (i.e., manipulation of individual qubit states of trapped ions, also referred to as "single-qubit gates"), and the XX gate corresponds to a two-qubit operation (i.e., manipulation of the entanglement of two trapped ions, also referred to as a "two-qubit gate"). For those of ordinary skill in the art, it should be clear that the R gates (single-qubit gates) can be implemented with near perfect fidelity, while the formation of the XX gates (two-qubit gates) is complex and there can exist one or more faulty two-qubit gates among the available XX gates. Such faulty two-qubit gates, if used in executing the quantum algorithm, lead to computational errors. Thus, faulty two-qubit gates are detected in block 704, either optionally calibrated in block 706, or excluded in the compiling of a quantum circuit that is used to execute the identified quantum algorithm in block 708.

In block 704, by the system controller 104, one or more faulty two-qubit gates among two-qubit gates that can be applied to pairs of qubits in the quantum processor are detected, as further discussed below. For example, in the quantum processor having 32 qubits, an average fidelity of the two-qubit gates may be about 95%. The number of faulty two-qubit gates may be one, two, or three. It should be noted that the method of detecting one or more faulty two-qubit gates described herein can be applied to any average fidelity of the two-qubit gates and any number of faulty two-qubit gates among all available two-qubit gates in the quantum processor.

In block 706, by the system controller 104, the one or more faulty two-qubit gates in the quantum processor detected in block 704 are optionally calibrated and corrected, by the methods know in the art. Faulty two-qubit gates are commonly caused by control errors due to lack of knowledge about how the trapped ions (i.e., qubits) behave during the two-qubit gate operations. Thus, tuning control parameters associated with hardware in the ion trap quantum computing system 100, such as amplitude, phase, and/or a time duration of a laser pulse to be applied to the qubits during the two-qubit gate operations, or the trapping potential of the ion trap 200, can reduce or eliminate an error in a faulty two-qubit gate. In some embodiments, multiple single qubit gates are applied to the qubits to calibrate a faulty two-qubit gate.

In block 708, by the classical computer 102, the computational task to solve the computational problem based on the quantum algorithm identified in block 702 is compiled into a quantum circuit using a set of universal logic gates (i.e., decomposed into a series of logic gates). In compiling the quantum circuit, the faulty two-qubit gates detected in block 704 are not excluded (i.e. not used), or if the faulty two-qubit gates are corrected in block 706, the corrected two-qubit gates are used.

In block 710, by the system controller 104, the quantum circuit is executed on the quantum processor. The execution of the quantum circuit can be performed by applying laser pulses, whose amplitudes and phases are properly adjusted by the methods known in the art, to the qubits in the quantum processor. Subsequently to the execution of the quantum circuit, by the system controller, one or more of the qubits in the quantum processor are measured by the method known in the art. In some embodiments, the quantum computational task is decomposed into multiple executions of a quantum circuit. Then, the process returns to block 704 to detect one or more faulty two-qubit gates, and compiling and executing one or more quantum circuits to complete the computation based on the identified quantum algorithm, the process proceed to block 712.

In block 712, by the classical computer 102, the measurement results of the one or more of the qubits in the quantum processor obtained in block 710 are processed to derive a solution to the computational problem identified in block 704 and output to a user interface, such as graphics processing unit (GPU) of the classical computer 102 and/or saved in the memory of the classical computer 102. For example, the computed solution can be represented in a table or as a graphic representation of the particles on a display coupled to the GPU.

Figure 8:
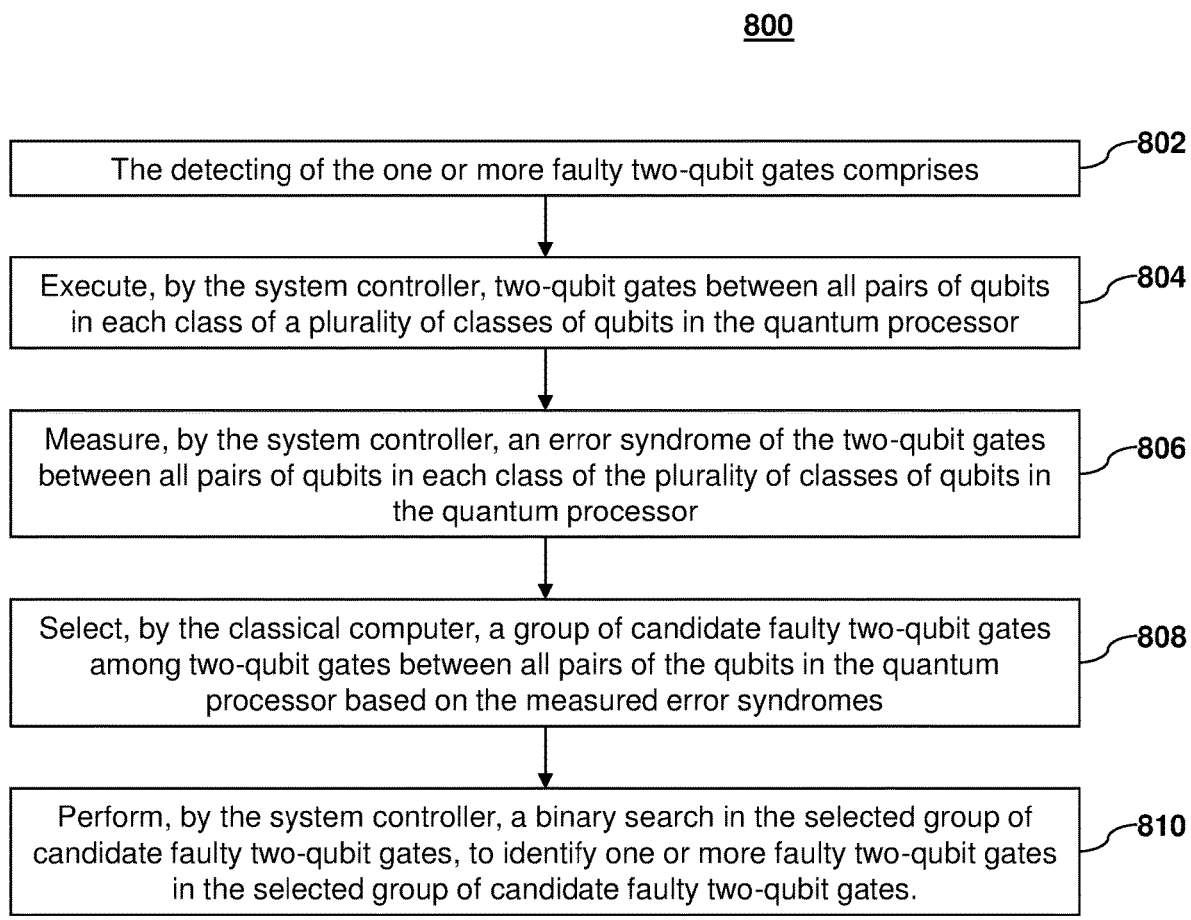
FIG. 8 depicts a flowchart illustrating a method of detecting faulty two-qubit gates according to one embodiment.

FIG. 8 depicts a flowchart illustrating a method 800 of detecting faulty two-qubit gates as shown in block 706 above. In this example, the number of qubits in the quantum processor is $N=2^n$ and each qubit is indexed by an n-digit binary number $(q_1 q_2 \ldots q_n)$. For example, the quantum processor may have 8 ($=2^3$) qubits. The qubits are then indexed as (000), (001), (010), (011), (100), (101), (110), and (111). Further, the qubits are grouped into 2n classes, denoted as (i, b), depending on the indices, where i-th (i ∈ {0, . . . , n−1}) digit binary number in the index is b ∈ {0, 1}. In each class (i, b), $2^{n-1}$ qubits are included. In the example of the quantum processor having 8 ($=2^3$) qubits, the qubits are grouped into 6 classes, (0, 0)∈{(000), (001), (010), (011)}, (0, 1)∈{(100), (101), (110), (111)}, (1, 0)∈{(000), (001), (100), (101)}, (1, 1)∈{(010), (011), (110), (111)}, (2, 0)∈{(000), (010), (100), (110)}, and (2, 1)∈{(001), (011), (101), (111)}.

In block 802, by the system controller 104, two-qubit gate between all pairs of qubits in class (i, b) are executed. There are $2^{n-1}$ qubits in class (i, b) and thus in total $2^{n-2}(2^{n-1}-1)$ two-qubit gate are performed. Two-qubit gate can be executed by application of laser pulses whose amplitudes and phases are properly adjusted to the corresponding pair of qubits. The amplitude and phases of laser pulses can be adjusted by the methods known in the art.

In block 804, by the system controller 104, an error syndrome of the two-qubit gates among all pairs of qubits in class (i, b) is measured. An "error syndrome" described herein is information regarding whether or not the two-qubit gates collectively include an error, which can be extracted by measurement of one or more qubits in class (i, b) and/or one or more ancillary qubits that are entangled with one or more qubits in class (i, b). In some embodiments, four XX gates are applied to each qubit pairs in class (i, b) and all qubits are measured.

The process returns to block 802 for a different class (i, b). After syndrome measurements for all 2n classes have been performed, the process proceeds to block 806.

In block 806, by the classical computer 102, a group of candidate faulty two-qubit gates is selected based on the measured error syndromes for all 2n classes. Among $2^{n-1}$ ($2^{n-1}$) two-qubit gates between all pairs of qubits among the $N=2^n$ qubits in the quantum processor, some of the two-qubit gates can be identified as not faulty from the results of the 2n error syndromes measured in blocks 802 and 804. For example, in the quantum processor that is identified to include a single faulty two-qubit gate, the number of two-qubit gates that can be identified not faulty from m faulty error syndromes (m=0, 1, . . . , n−1) among the 2n error syndromes is $2^{n-1}(2^n-1)-2^{n-1-m}$, and thus the number $N_C$ of candidate faulty gates is $2^{n-1-m}$, which is at most $2^{n-1}$ (=N/2).

In block 808, a candidate faulty two-qubit gate between a first qubit ($q_1 q_2 \ldots q_n$) and a second qubit ($q'_1 q'_2 \ldots q'_n$) can be selected based on the m faulty error syndromes in class ($i_0$, $b_0$), ($i_1$, $b_1$), . . . ($i_{m-1}$, $b_{m-1}$). For each faulty error syndrome measurement for a class (i, b), binary numbers of corresponding digit (i.e., i-th digit) of the first and second qubits are set to the binary number b in the class (i, b). That is, the $i_0$-th digit binary numbers of the first qubit and the second qubit are both $b_0$, the $i_1$-th digit binary numbers of the first qubit and the second qubit are both $b_1$, the $i_{m-1}$-th bit values of the first qubit and the second qubit are both $b_{m-1}$, and so on. For the (n−m) remaining digits of each of the first qubit and the second qubit, a binary number of a digit of the first qubit is set to be complementary to a binary number of the corresponding digit of the second qubit (i.e., l-th digit of the first qubit $q_1$ is set to be 0 and the l-th digit of the second qubit $q'_1=1$ or vice versa). There are $$N_C \left( = \frac{1}{2} \cdot 2^{n-m} \right)$$

such combinations of complementary binary numbers.

In block 810, by the system controller 104, a binary search in the selected group of the $N_C$ candidate faulty two-qubit gates is performed to pinpoint the faulty two-qubit gates. A binary search starts with dividing the selected group of the $N_C$ candidate faulty two-qubit gates into a first sub group and a second sub group, each including mutually exclusive $N_C/2$ candidate faulty two-qubit gates (at most $2^{n-1}$ faulty two-qubit gates), and measuring an error syndrome of the first sub group. If the error syndrome of the first sub group does not show any error, an error syndrome of the second sub group is measured. The binary search continues by diving the sub group, whose error syndrome shows an error, into two sub-groups, each including the $N_C/4$ candidate faulty two-qubit gates (at most $2^{n-2}$ faulty two-qubit gates), and measuring an error syndrome of one of those sub groups. The binary search continues this way until the one or more faulty gates are identified. The step of dividing a group of candidate faulty gates in two sub groups is repeated at most n−1 times if one faulty gate is identified. The one or more faulty gates that are identified in block 810 are returned to the classical computer 102 and the process proceeds to block 708.

In the embodiments described herein, the methods of performing a quantum computation while debugging quantum circuits. With the methods described herein, a single faulty two-qubit gate among $\sim N^2$ two-qubit gates in a quantum processor having N qubits can be identified by only $3 \log_2 N - 1$ tests. Two faulty two-qubit gates can be identified by $3.25 \log_2 N$ tests on average. Three faulty two-qubit gates can be identified by approximately $4.947 \log_2 N$ tests on average.

It should be noted that the particular example embodiments described above are just some possible examples of a hybrid quantum-classical computing system according to the present disclosure and do not limit the possible configurations, specifications, or the like of hybrid quantum-classical computing systems according to the present disclosure. For example, a quantum processor within a hybrid quantum-classical computing system is not limited to a group of trapped ions described above. For example, a quantum processor may be a superconducting circuit that includes micrometer-sized loops of superconducting metal interrupted by a number of Josephson junctions, functioning as qubits (referred to as flux qubits). The junction parameters are engineered during fabrication so that a persistent current will flow continuously when an external magnetic flux is applied. As only an integer number of flux quanta are allowed to penetrate in each loop, clockwise or counter-clockwise persistent currents are developed in the loop to compensate (screen or enhance) a non-integer external magnetic flux applied to the loop. The two states corresponding to the clockwise and counter-clockwise persistent currents are the lowest energy states; differ only by the relative quantum phase. Higher energy states correspond to much larger persistent currents, thus are well separated energetically from the lowest two eigenstates. The two lowest eigenstates are used to represent qubit states $|0\rangle$ and $|1\rangle$. An individual qubit state of each qubit device may be manipulated by application of a series of microwave pulses, frequency and duration of which are appropriately adjusted.

While the foregoing is directed to specific embodiments, other and further embodiments may be devised without departing from the basic scope thereof, and the scope thereof is determined by the claims that follow.

The invention claimed is:

1. A method of performing computation using a hybrid quantum-classical computing system comprising a classical computer, a system controller, and a quantum processor comprising a plurality of qubits, comprising:
    detecting, by use of the classical computer and the system controller, one or more faulty two-qubit gates among a plurality of two-qubit gates that can be applied to pairs of qubits in the quantum processor, the detecting of the one or more faulty two-qubit gates comprising:
    executing, by the system controller, two-qubit gates between all pairs of qubits in each class of a plurality of classes of qubits in the quantum processor;
    measuring, by the system controller, an error syndrome of the two-qubit gates between all pairs of qubits in each class of the plurality of classes of qubits in the quantum processor;
    selecting, by the classical computer, a group of candidate faulty two-qubit gates among two-qubit gates between all pairs of the qubits in the quantum processor based on the measured error syndromes; and
    performing, by the system controller, a binary search in the selected group of candidate faulty two-qubit gates, to identify one or more faulty two-qubit gates in the selected group of candidate faulty two-qubit gates;

compiling, by use of the classical computer, a computational task to solve a computational problem based on a quantum algorithm into a series of logic gates, comprising a plurality of single-qubit gates and two-qubit gates of the plurality of two-qubit gates that exclude the detected one or more faulty two-qubit gates;

executing, by the use of the system controller, the series of logic gates on the quantum processor;

measuring, by the use of the system controller, one or more of the qubits in the quantum processor; and outputting, by use of the classical computer, a solution to the computational problem derived from the measured results of the one or more of the qubits in the quantum processor.

2. The method according to claim 1, wherein
each class of the plurality of classes of qubit comprises a half of the qubits in the quantum processor, and
the plurality of classes comprises 2n classes, where $2^n$ is the number of qubits in the quantum processor.

3. The method according to claim 2, wherein:
the group of candidate faulty two-qubit gates comprises at most $2^{n-1}$ two-qubit gates.

4. The method according to claim 2, wherein:
the group of candidate faulty two-qubit gates comprises $2^{n-1-m}$ two-qubit gates, where m is the number of the measured error syndromes that are faulty.

5. The method according to claim 1, wherein
the binary search comprises
dividing the selected group of candidate faulty two-qubit gates into two sub groups; and
measuring an error syndrome of one of the two sub groups.

6. The method according to claim 1, further comprising:
correcting, by the system controller, the detected one or more faulty two-qubit gates.

7. The method according to claim 1, further comprising:
repeating the detecting of one or more faulty two-qubit gates, the executing the series of logic gates, the measuring of one or more of the qubits in the quantum processor.

8. A hybrid quantum-classical computing system, comprising:
a quantum processor comprising a group of trapped ions, each trapped ion of the group of trapped ions having two hyperfine states defining a qubit;
one or more lasers configured to emit a laser beam, which is provided to trapped ions in the quantum processor;
a classical computer; and
a system controller configured to control the emission of the laser beam from the one or more lasers to be applied to the trapped ions in the quantum processor, wherein
the classical computer and the system controller are configured to perform operations comprising:
detecting, by use of the classical computer and the system controller, one or more faulty two-qubit gates among a plurality of two-qubit gates that can be applied to pairs of qubits in the quantum processor, the detecting of the one or more faulty two-qubit gates comprising:
executing, by the system controller, two-qubit gates between all pairs of qubits in each class of a plurality of classes of qubits in the quantum processor;
measuring, by the system controller, an error syndrome of the two-qubit gates between all pairs of qubits in each class of the plurality of classes of qubits in the quantum processor;
selecting, by the classical computer, a group of candidate faulty two-qubit gates among two-qubit gates between all pairs of the qubits in the quantum processor based on the measured error syndromes; and
performing, by the system controller, a binary search in the selected group of candidate faulty two-qubit gates, to identify one or more faulty two-qubit gates in the selected group of candidate faulty two-qubit gates;
compiling, by use of the classical computer, a computational task to solve a computational problem based on the quantum algorithm into a series of logic gates, comprising a plurality of single-qubit gates and two-qubit gates of the plurality of two-qubit gates that exclude the detected one or more faulty two-qubit gates;
executing, by the use of the system controller, the series of logic gates on the quantum processor;
measuring, by the use of the system controller, one or more of the qubits in the quantum processor; and
outputting, by use of the classical computer, a solution to the computational problem derived from the measured results of the one or more of the qubits in the quantum processor.

9. The hybrid quantum-classical computing system according to claim 8, wherein
each class of the plurality of classes of qubit comprises a half of the qubits in the quantum processor, and
the plurality of classes comprises 2 log N classes, where N is the number of qubits in the quantum processor.

10. The hybrid quantum-classical computing system according to claim 9, wherein:
the group of candidate faulty two-qubit gates comprises at most N/2 two-qubit gates.

11. The hybrid quantum-classical computing system according to claim 9, wherein:
the group of candidate faulty two-qubit gates comprises $2^{n-1-m}$ two-qubit gates, where m is the number of the measured error syndromes that are faulty.

12. The hybrid quantum-classical computing system according to claim 8, wherein
the binary search comprises
dividing the selected group of candidate faulty two-qubit gates into two sub groups; and
measuring an error syndrome of one of the two sub groups.

13. The hybrid quantum-classical computing system according to claim 8, wherein the operations further comprises:
correcting, by the system controller, the detected one or more faulty two-qubit gates.

14. The hybrid quantum-classical computing system according to claim 8, wherein the operations further comprise:
repeating the detecting of one or more faulty two-qubit gates, the executing the series of logic gates, the measuring of one or more of the qubits in the quantum processor.

15. A hybrid quantum-classical computing system comprising:
a classical computer;
a quantum processor comprising a plurality of qubits;
a system controller; and non-volatile memory having a number of instructions stored therein which, when executed by one or more processors, causes the hybrid quantum-classical computing system to perform operations comprising:

detecting, by use of the classical computer and the system controller, one or more faulty two-qubit gates among a plurality of two-qubit gates that can be applied to pairs of qubits in the quantum processor, the detecting of the one or more faulty two-qubit gates comprising:

executing, by the system controller, two-qubit gates between all pairs of qubits in each class of a plurality of classes of qubits in the quantum processor;

measuring, by the system controller, an error syndrome of the two-qubit gates between all pairs of qubits in each class of the plurality of classes of qubits in the quantum processor;

selecting, by the classical computer, a group of candidate faulty two-qubit gates among two-qubit gates between all pairs of the qubits in the quantum processor based on the measured error syndromes; and performing, by the system controller, a binary search in the selected group of candidate faulty two-qubit gates, to identify one or more faulty two-qubit gates in the selected group of candidate faulty two-qubit gates;

compiling, by use of the classical computer, a computational task to solve a computational problem based on the quantum algorithm into a series of logic gates, comprising a plurality of single-qubit gates and two-qubit gates of the plurality of two-qubit gates that exclude the detected one or more faulty two-qubit gates;

executing, by the use of the system controller, the series of logic gates on the quantum processor;

measuring, by the use of the system controller, one or more of the qubits in the quantum processor; and outputting, by use of the classical computer, a solution to the computational problem derived from the measured results of the one or more of the qubits in the quantum processor.

16. The hybrid quantum-classical computing system according to claim 15, wherein each class of the plurality of classes of qubit comprises a half of the qubits in the quantum processor, and the plurality of classes comprises 2n classes, where $2^n$ is the number of qubits in the quantum processor.

17. The hybrid quantum-classical computing system according to claim 15, wherein the binary search comprises dividing the selected group of candidate faulty two-qubit gates into two sub groups; and measuring an error syndrome of one of the two sub groups.

* * * * *